US006398681B1

United States Patent
Wanie

(10) Patent No.: US 6,398,681 B1
(45) Date of Patent: Jun. 4, 2002

(54) TENSIONING DEVICE

(75) Inventor: Lee Joseph Wanie, Horicon, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/442,553

(22) Filed: Nov. 18, 1999

(51) Int. Cl.$^7$ .............................. F16H 7/08; F16H 7/22; F16H 7/14
(52) U.S. Cl. ........................ 474/101; 474/115; 474/117; 180/53
(58) Field of Search ................................ 474/101, 109, 474/113, 114, 115, 117, 118, 900, 901; 305/57, 200, 196; 180/87.2, 53.8, 53.4, 23.1; 56/16.7, 17.1, 255, 10.3

(56) References Cited

U.S. PATENT DOCUMENTS

| | | | |
|---|---|---|---|
| 1,476,450 A | * 12/1923 | Lee .............................. | 474/115 |
| 3,613,815 A | * 10/1971 | Meylink et al. ............... | 180/53 |
| 4,571,221 A | *  2/1986 | Isobe et al. .................. | 474/101 |
| 4,983,146 A | *  1/1991 | Charles et al. ............... | 474/117 |
| 5,640,891 A | *  6/1997 | Hoffa ........................ | 83/424 X |

OTHER PUBLICATIONS

Deere & Company, Lawn and Garden Tractors brochure, 14 pages, see particularly page numbered 11, date of publication—Mar. 1999, published in U.S.A., Feb. 6, 2001.

Deere & Company, LT Series Lawn Tractors brochure, 8 pages, see particularly p. 6, date of publication—Dec. 1998, published in U.S.A., Feb. 6, 2001.

Deere & Company, Compact Utility Tractors brochure, 16 pages, see particularly p. 10, date of publication—Dec. 1996, published in U.S.A., Feb. 6, 2001.

Deere & Company, Sabre by John Deere Lawn Tractors, Yard Tractors, Garden Tractors brochure, 12 pages, see particularly p. 7, date of publication—Feb. 1999, published in U.S.A., Feb. 6, 2001.

* cited by examiner

*Primary Examiner*—David A. Bucci
*Assistant Examiner*—Marcus Charles

(57) ABSTRACT

A device for tensioning a drive belt extending between a vehicle power source and its driven attachment is provided. The device includes first and second members slideably coupled together and adapted to extend between and operably engage a first powered shaft member and a second shaft member carried on the attachment. A compression spring is coupled with the slideable members for urging them apart and tensioning a belt entrained around pulleys carried on the two shaft members. An overcenter locking structure is provided to secure the spring in its compressed configuration or release the compression and retract the slideable members for removal, adjustment and/or installation. Adjustable stops abutting the ends of the spring permit the level of spring force to be selected for a variety of applications.

22 Claims, 7 Drawing Sheets

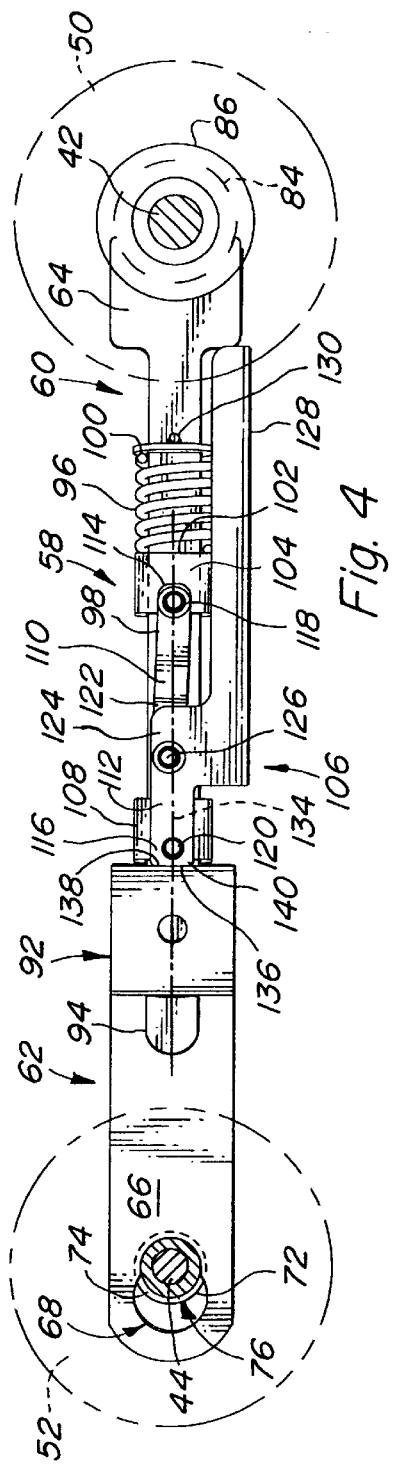
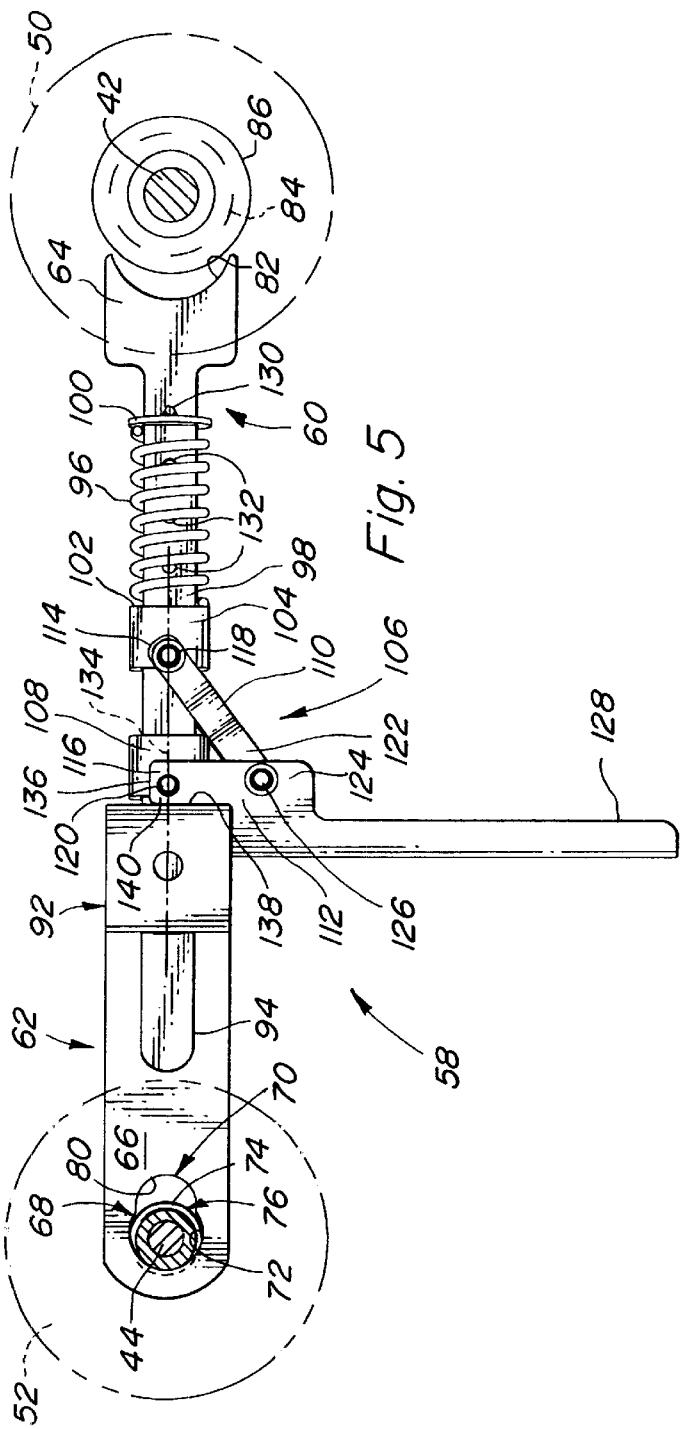
Fig. 4
Fig. 5

TENSIONING DEVICE

BACKGROUND OF THE INVENTION

1. Field of the Invention

The present invention relates generally to belt drives and more specifically to a tensioning device that can quickly and easily tension a belt or endless drive element used to transmit power between a vehicle and its driven attachment.

2. Description of the Related Art

Vehicles such as lawn and garden tractors are commonly used in combination with implements such as rotary mowers. These implements are frequently powered by an endless drive element such as a belt. The belts are entrained about a pair of pulleys, one pulley being coupled with a shaft either driven by or powered by the engine crankshaft and the other pulley being coupled with a shaft on the implement. To maintain tension on the belt and ensure transmission of power between the shafts and their pulleys, one shaft is movable relative to the other and a tensioning device is used to urge them apart.

Changes in the tension of belts are commonly required when an implement is installed, removed, the belts are replaced or they stretch due to wear. Since the implements are often adapted to be adjusted vertically and/or laterally with respect to the vehicle, the relative positions of the two shafts and their pulleys will change, also requiring occasional adjustments to the belt tension.

One common method of tensioning such belts utilizes a driven pulley swingably mounted on a shaft carried by the implement with a biasing mechanism for urging the shaft and its pulley away from the driving shaft. The driving shaft is typically mounted for rotation in bearings with both shafts being mounted in a cantilevered arrangement to allow them to carry a pulley at their outer end portion. Since these biasing mechanisms serve to urge the shaft and its driven pulley away from the driving shaft and its pulley to increase the belt tension, the resulting forces transferred to the end portions of the two shafts by the belt tension serve to urge the ends of the shafts toward one another with bending forces being encountered at the end portions of the shafts. These bending forces vary as the implement is adjusted relative to the vehicle.

The bending forces not only accelerate wear between the shafts and their respective bearing supports, but can also cause complete bearing failures. Since the crankshaft often serves as the driving shaft, the bearings which support it inside the engine can fail, resulting in substantial repair expense.

For these reasons, it would be desirable to provide a tensioning mechanism that will reduce or minimize the bending forces transferred to the two shafts as the belt is tensioned, and also provide a relatively constant tensioning force as the position of the implement is vertically and/or laterally adjusted relative to the vehicle.

SUMMARY OF THE INVENTION

Towards these ends, there is provided a tensioning device usable with generally parallel and spaced apart first and second shaft members, wherein one member is movable relative to the other and each supports a pulley carried on a cantilevered end portion. It is effective to urge the shaft members apart and provide tension to an endless belt element entrained about the pulleys.

The tensioning device extends between and engages each shaft member so that the forces urging the shaft members apart are applied directly to the shaft members to minimize the bending forces imposed upon their cantilevered end portions.

It maintains engagement with the shaft members as the implement is adjusted vertically and/or laterally relative to the vehicle so that forces exerted on the members remains relatively constant.

Provision is made for adjusting the degree of force exerted on the shaft members by the tensioning device to accommodate belt wear, the amount of belt drive force required for transmitting power under different conditions and compensate for adjustment of the implement.

A quick-release capability is included to allow the device to be rapidly and easily installed, secured in place and/or removed. The device is simple, has few parts and can be utilized with a variety of drive and driven shaft member configurations, irrespective of whether they are oriented vertically, horizontally or otherwise.

The tensioning device of the preferred embodiment includes first and second slideable members coupled together and extending between first and second shaft members having respective pulleys with a belt entrained thereabout. One of the shaft members is movable relative to the other to permit adjustment of the distance between the shaft members and tensioning of the endless drive member. An end portion of each slideable member is removably engaged with a seat provided on each shaft member that facilitates quick and easy coupling with and/or removal from the shaft members and also allow vertical and lateral adjustment of one shaft member relative to the other.

The slideable members are provided with a compression spring that urges them and their engaged shaft members apart with adjustment capability being provided to change the level of force exerted by the device. An overcenter locking mechanism is provided to allows the tensioning device to be quickly and easily installed or removed. A latching structure serves to releasably secure the overcenter locking mechanism and tensioning device in its operative configuration.

BRIEF DESCRIPTION OF THE DRAWINGS

FIG. 4 is a plan view of the tensioning mechanism with the locking mechanism in its closed position.

FIG. 5 is a view similar to FIG. 4, but with the locking mechanism in its released position.

DESCRIPTION OF THE PREFERRED EMBODIMENT

Figure 1:
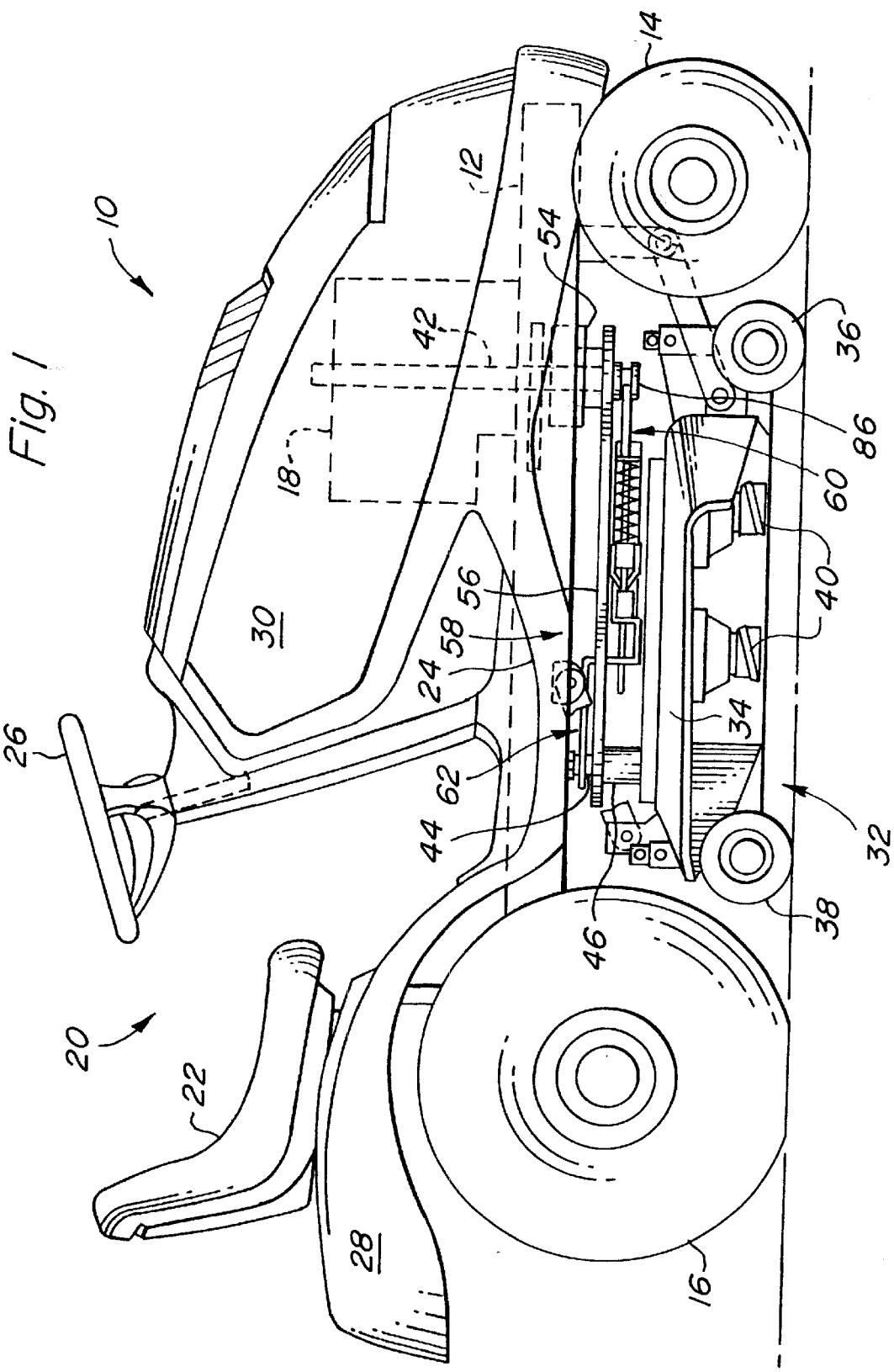
FIG. 1 is a side view of a lawn and garden type vehicle with a mower deck mounted there beneath and illustrating the tensioning device between the engine drive shaft member and mower deck driven shaft member.

Looking first to FIG. 1, there is shown a side view of a small vehicle 10 such as a lawn and garden tractor having a frame 12 supported on front and rear wheels 14 and 16, an engine 18 carried by the frame 12, an operator station 20 including a seat 22, footrest 24 and steering wheel 26, rear fenders 28 and a hood 30 enclosing the engine 18. Carried below the frame 12 and between the front and rear wheels 14 and 16 is a mower deck implement 32 which includes a housing 34, front and rear gage wheels 36 and 38, and cutting blades 40, shown in schematic and partial form. The engine 18, depicted in phantom block form, includes a crank shaft 42 which extends vertically downwardly and serves as a driving or first shaft member 42.

Figure 2:
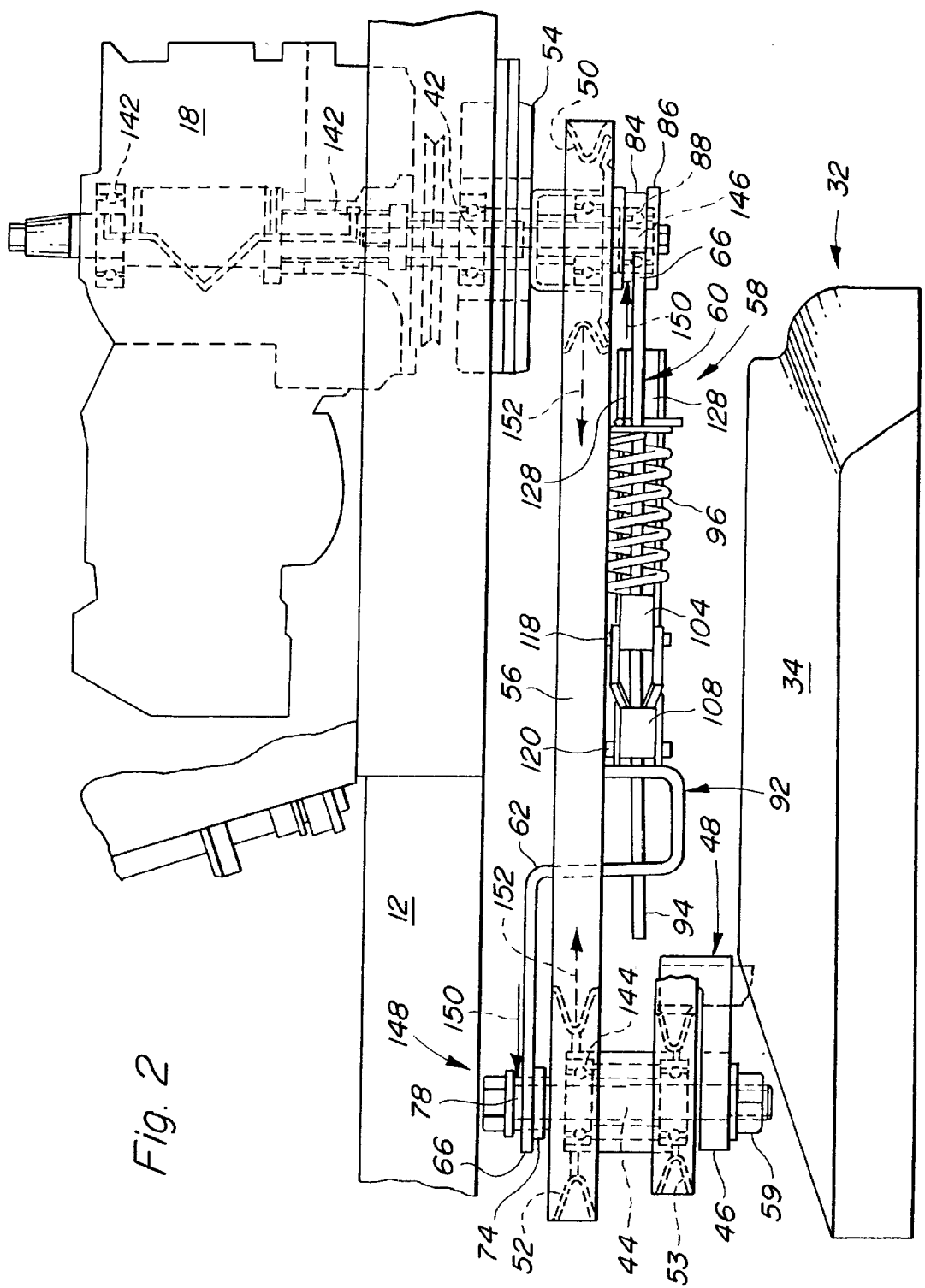
FIG. 2 is an enlarged side view of a portion of the vehicle and deck and illustrating in greater detail the tensioning device between the driving and driven shaft members.

As better shown in FIG. 2, the first shaft member 42 of the engine 18 is oriented substantially parallel to a second shaft member 44 carried by the implement 32. In the preferred embodiment, the shaft member 44 takes the form of a bolt. The second shaft member 44 is mounted in one leg 46 of an L-shaped support arm 48 that is pivotally mounted on the deck 34 to allow the second shaft member 44 to move with the deck 34 towards and away from the first shaft member 42 and also swing on the deck 34 about its pivotal connection with the deck 34. On each of the shaft members 42 and 44 are respectively mounted rotatable pulleys 50 and 52. In an the preferred embodiment illustrated in FIG. 2, there is also provided an electric clutch assembly 54 for selectively engaging the drive pulley 50 with the engine crank shaft or first shaft member 42. An endless drive element 56 such as a belt is entrained about the first and second pulleys 50 and 52 to transmit power from the engine 18 to the implement pulley 52 for rotating the blades 40 of the implement 32. The tensioning device 58, subject of the present patent, extends between the first and second shaft members 42 and 44 to urge them apart and tension the belt 56.

Figure 3:
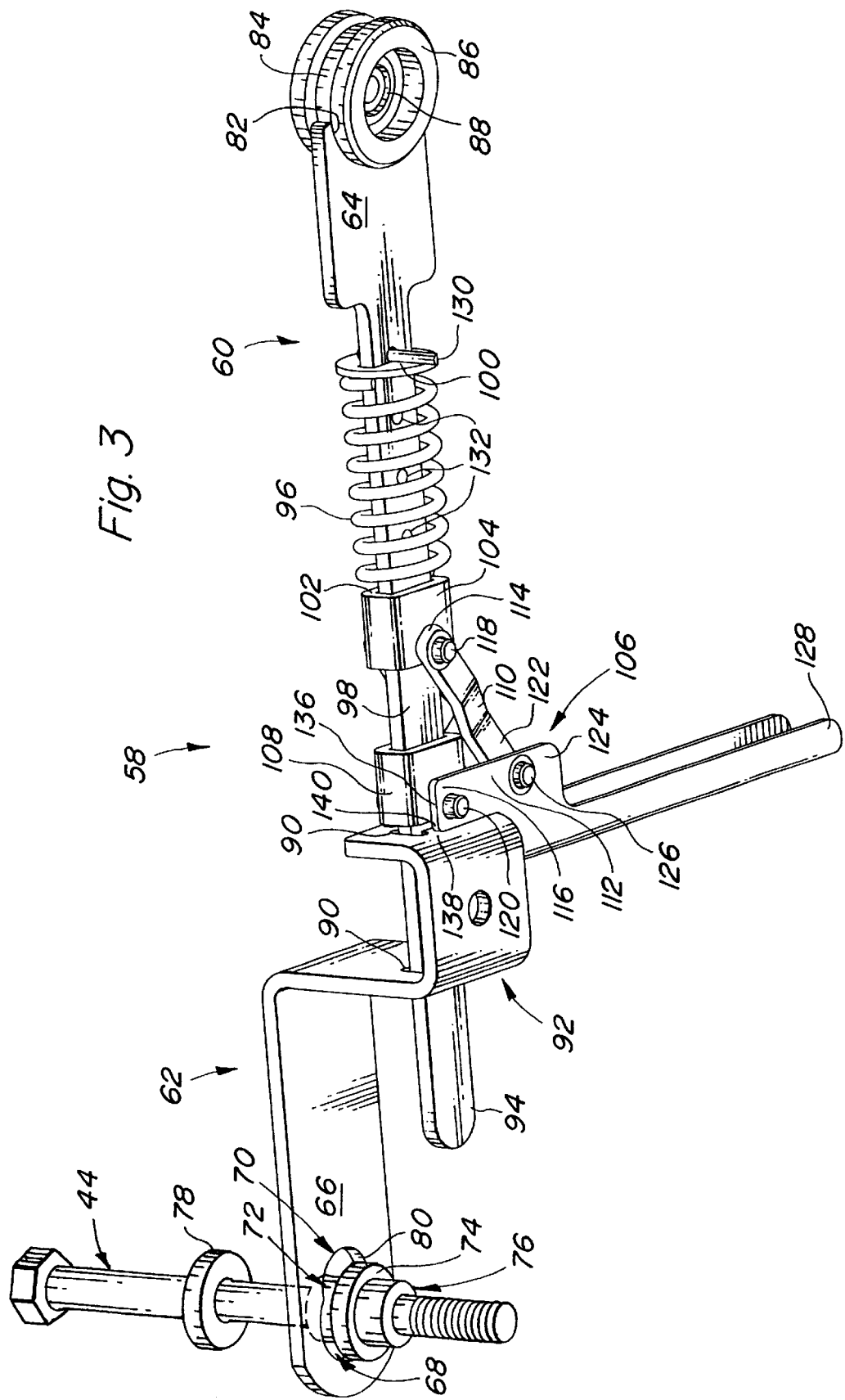
FIG. 3 is an enlarged perspective view of the tensioning device with the locking mechanism in its released position and the slideable members retracted.

Looking as well to FIG. 3, there is illustrated an enlarged perspective view of the tensioning device 58. It includes first and second members 60 and 62 which are slideably coupled together with each member 60 and 62 having a respective end portion 64 and 66 that can be operatively and engageably connected with one of the first and second shaft members 42 and 44. In the preferred embodiment, both slideable members 60 and 62 are formed of flat bar stock. In the end portion 66 of the second slideable member 62 is provided an opening 68 which is generally circular in form with an offset smaller circular portion 70 at one side. The larger opening 68 is sized to permit the end 66 of the second slideable member 62 to be placed over and then lowered into position in the channel or groove 72 formed between ledge 74 of spacer 76 and the washer 78. The spacer 76 and washer 78 are secured adjacent each side of the end portion 66 of the second shaft member or bolt 44 by the nut 59, see also FIGS. 2, 4 and 5. Once positioned within the channel 72, the second slideable member 62 is moved from the position illustrated in FIG. 5 to the position shown in FIG. 4 to allow the seat or face 80 of the smaller circular portion 70 to engage the groove or channel 72. Looking again to FIG. 3 and the first slideable member 60, it will be seen that it also includes a seat 82 at its end portion 64 in the form of a circular face 82 that is adapted to similarly engage a channel or groove 84 of a spacer 86 rotatably mounted on bearings 88 surrounding the first shaft member 42.

The first and second slideable members 60 and 62 are operatively coupled together for telescoping movement. As is best shown in FIG. 3, a pair of spaced apart openings 90 are provided in a stirrup or yoke 92 formed at one end of the second slideable member 62. The other end portion 94 of the first slideable member 60 is received through these openings 90 to move back and forth therein. For urging the first and second slideable members 60 and 62 apart, a compression spring 96 is provided that surrounds an elongated body portion 98 of the first slideable member 60. The spring 96 is restrained between a first adjustable stop 100 provided on the first slideable member 60 and a second shiftable stop surface 102 carried at the end of a sleeve or collar 104.

A locking mechanism 106 is provided on the tensioning mechanism 58 to secure the spring 96 in a compressed state between the two stops 100 and 102 or shift the collar 104 and its stop surface 102 to release the degree of compression of the spring 96. The locking mechanism 106, best shown in FIGS. 3, 4 and 5, includes the first and second slides or collars 104 and 108 which take the form of generally rectangular sleeves received on the elongated body portion 98. An overcenter linkage including first and second links 110 and 112 extends between the collars 104 and 108. Pair of links 110 and 116 are provided, one on each side of the collars 104 and 108. The opposite ends 114 and 116 of the links 110 and 112 are coupled to the collars 104 and 108 by pins 118 and 120 while the adjacent ends 122 and 124 are joined by a pin 126. A handle 128 is rigidly joined to the second link 112 for pivotal movement about the pin 120. As the handle 128 is moved between the positions illustrated in FIGS. 4 and 5, it secures the compression spring 96 in either its compressed or released configuration. As the handle 128 is moved to its open position, the second stop 102 moves away from the first stop 100 to reduce the spring compression. In the preferred embodiment, there is no compression of the spring 96 as the handle 128 reaches its full open position. This allows the slideable members 60 and 62 to telescope towards one another and permit the tensioning device 58 to be inserted between or removed from between the first and second shaft members 42 and 44.

The level of compression of the spring 96 can be adjusted through use of a pin 130 and series of openings 132 provided in the first slideable member 60, see FIG. 3. Through selecting which of the openings 132 the pin 130 is positioned within, the first stop member 100 can be moved along the length of the first slideable member 60 to adjust the position of that stop 100 and therefore vary the compression of the spring 96. This feature allows the tensioning device 58 to be used in a variety of applications having differing spacings between their first and second shaft members 42 and 44. It further permits the force exerted by the tensioning device 58 to be maintained as the spring 90 loses its resiliency or should the belt slip as torque requirements vary.

An overcenter latching structure is provided to secure the locking mechanism 106 in the position illustrated in FIG. 4. This structure is comprised of the two links 110 and 112 and the arrangement of pins 118, 120 and 126 which interconnect and anchor them for swinging movement. As the handle 128 of the locking mechanism 106 moves from the position of FIG. 5 to that of FIG. 4, the center pin 126 moves across a line 134 extending through pins 118 and 120 and to the overcenter position illustrated in FIG. 4, latching the handle 128 in that position.

Looking again to the locking mechanism 106 illustrated in FIGS. 3, 4 and 5, it will be seen that there is a face 136 provided on the end of the second overcenter link member 112 which contacts one side 138 of the U-shaped section 92 when the latching structure is in the position illustrated in FIG. 4. This flat face 136 is closer to the pivot pin 120 than is the corner 140 of the link 112. Accordingly, movement of the link 112 from the FIG. 4 position to the FIG. 5 position will swing the corner 140 against the face 136 and push the collar 108 away from the side 138. Once the corner 140 has swung past the side 138, the link 112 and its collar 108 can move back towards the side 138. This relationship between the face 136, pin 120 and corner 140 of the link 1 12 serves as an additional overcenter latching structure to secure the locking mechanism 106 in the FIG. 4 position.

Figure 6:
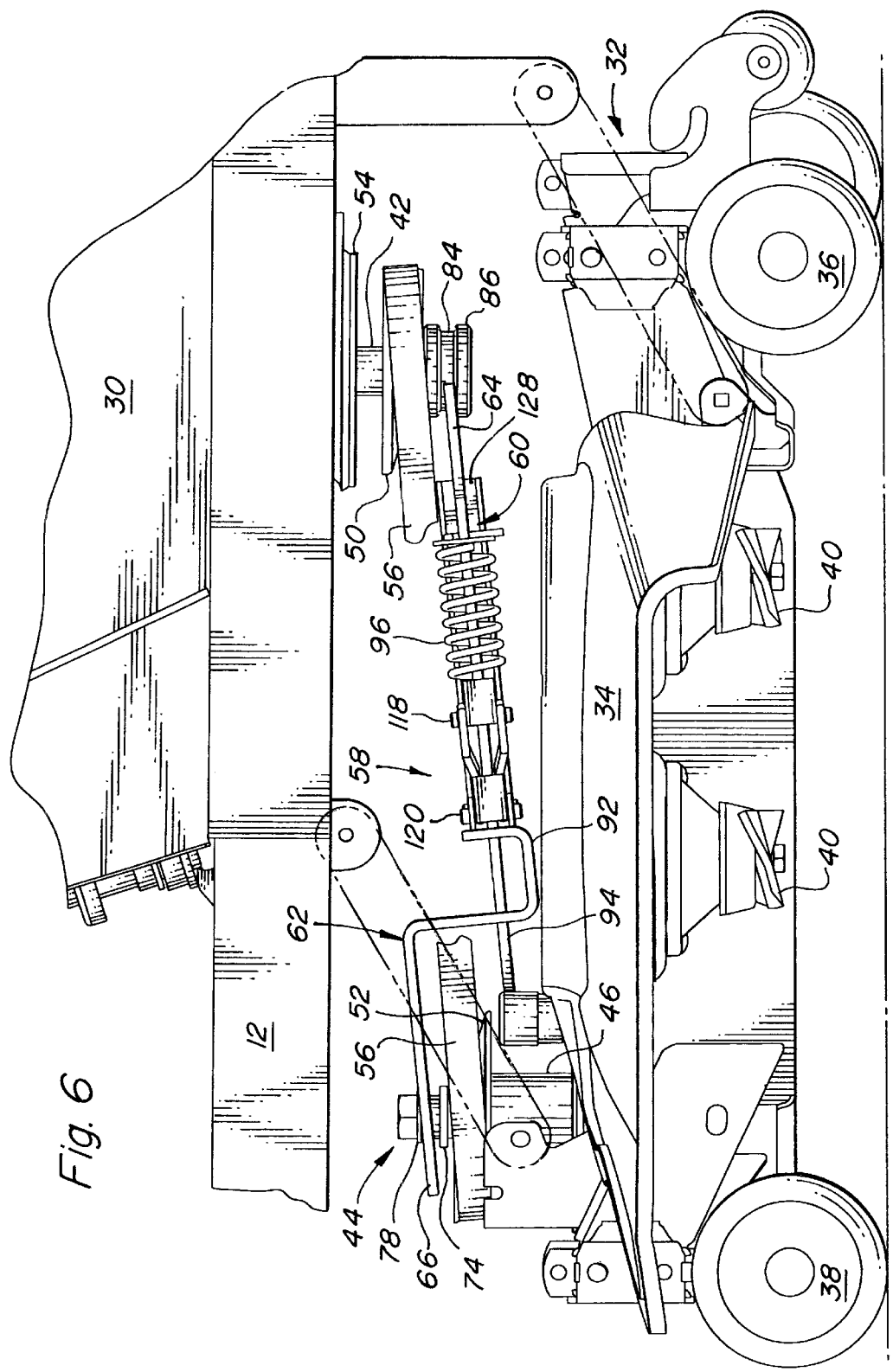
FIG. 6 is a view similar to FIG. 2, but illustrating the mower deck implement in a vertically lowered and forwardly adjusted position relative to the vehicle.
Figure 7:
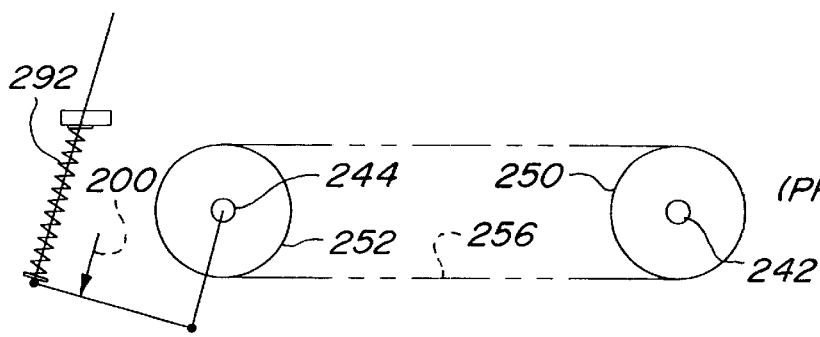
FIG. 7 is a schematic plan view of a prior art tensioning arrangement which utilizes a compression spring to move the driven pulley with respect to the drive pulley.
Figure 8:
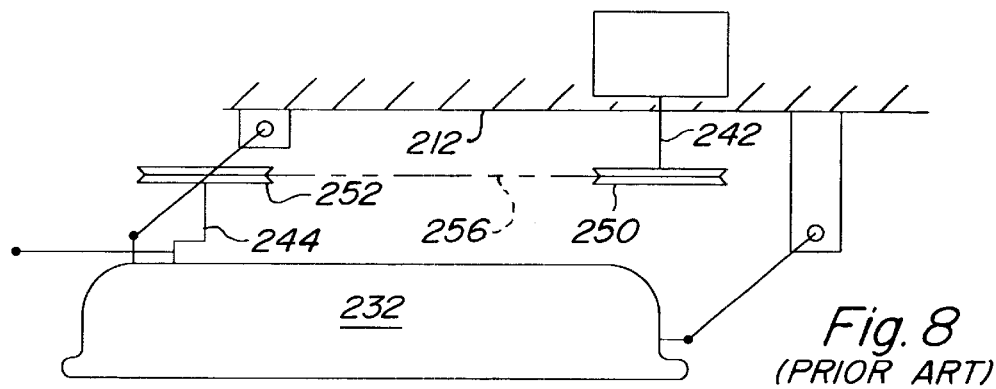
FIG. 8 is a schematic side view of the prior art tensioning arrangement of FIG. 7 and the mower deck implement.
Figure 9:
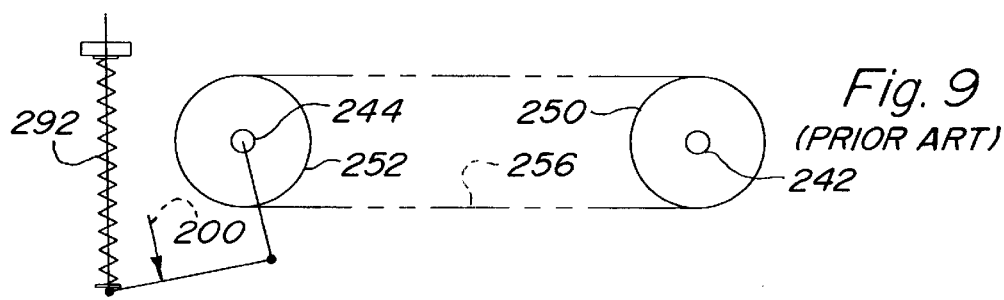
FIG. 9 is a plan view of the prior art tensioning arrangement of FIG. 7 illustrating the compression spring in the extended configuration found when the implement is in a lowered position.
Figure 10:
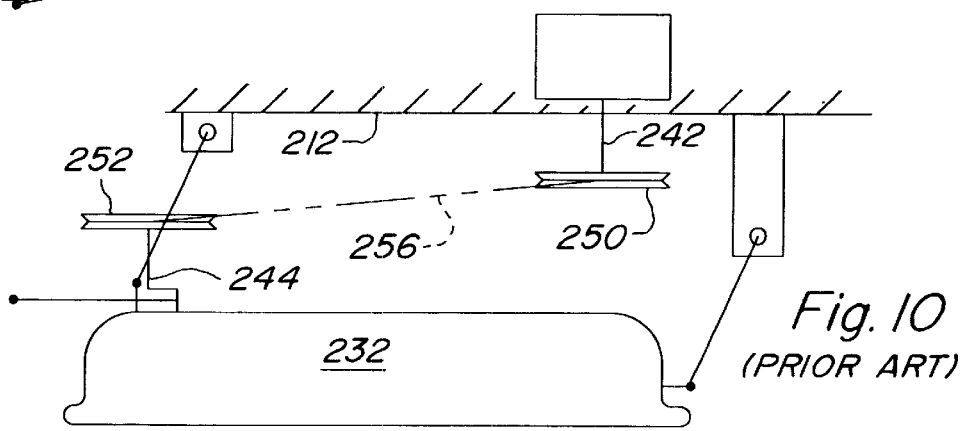
FIG. 10 is a schematic side view of FIG. 9 prior art tensioning arrangement of FIG. 7 illustrating the compression spring in the contracted configuration found when the implement is in a raised position.

Returning to FIG. 3, it will be seen that the end portions 64 and 66 of the first and second slideable members 42 and 44 include seats or faces 80 and 82 generally semi-circular in configuration which are compatibly shaped to be received in the respective grooves or seats 84 and 72 of the spacers 86 and 76 on the respective first and second shaft members 42 and 44. Since the grooves 84 and 72 are slightly oversized in comparison to the thickness of the end portions 64 and 66 being received in the grooves 84 and 72, the tensioning device 58 can be inclined from perpendicular to the shaft members 42 and 44, as shown in FIG. 6, and still provide the pre-selected tensioning force when the implement 32 is vertically and/or laterally adjusted and the second shaft member 44 shifts relative to the first shaft member 42. With the implement 32 lowered relative to the vehicle frame 12 as shown in FIG. 6, it will be seen that the end portions 64 and 66 of the first and second slideable members 60 and 62 and their faces 82 and 80 still engage the respective grooves 84 and 72 in the spacers 86 and 76 carried on the ends of the first and second shaft members 42 and 44. In this manner, the tensioning device 58 is effective in applying a generally constant force to the ends of shafts 42 and 44 throughout a range of vertical and lateral adjustment of the implement 32 relative to the vehicle 10.

To install the tensioning device 58 in a tractor-implement combination, the locking mechanism 106 would be opened as illustrated in FIGS. 3 and 5 to relieve the force exerted by the compression spring 96 between the first and second stops 100 and 102 and allow the first and second slideable members 60 and 62 to retract. The larger opening 68 at the end 66 of the second slideable member 62 would then be positioned over the end of the second shaft member 44, as shown in FIGS. 3 and 5, and lowered into place in the groove 72 formed between ledge 74 and washer 78. The second slideable member 62 would next be laterally shifted to engage the semi-circular face 80 with the groove 72, as shown in FIG. 4. Then the other end portion 64 of the first slideable member 60 would be aligned with the groove 84 in the spacer 86 on the first shaft member 42 and the face 82 of that end portion 64 engaged in the groove 84 of the spacer 86, as illustrated in FIGS. 2, 3, 5 and 6. Next, the handle 124 of the overcenter locking mechanism 106 would be moved from the position illustrated in FIG. 5 to the position illustrated in FIG. 4 to telescopically expand the two slideable members 60 and 62 and provide the force urging the first and second slideable members 60 and 62 apart to tension the belt 56 entrained about the first and second pulleys 50 and 52. It is to be understood that in place of a belt 56 and pulleys 50 and 52, a chain and sprocket arrangement or equivalent endless belt drive that required tensioning could be used. Since the force exerted by the compression spring 96 remains substantially constant as the implement 32 moves relative to the vehicle 10, compare FIGS. 2 and 6, the tension on the belt 56 would remain substantially constant as the position of the implement 32 is adjusted.

As tension is maintained in the belt 56 to transmit power from the driving shaft 42 to the driven shaft 44, it pulls on the pulleys 50 and 52 with resulting forces being exerted on the first and second shaft members 42 and 44 that tends to pull them toward one another. As best shown in FIG. 2, the first shaft member 42 is mounted at its end in bearings 140. Pulleys 50 and 52 are carried at the respective cantilevered outer end portions 146 and 148 of the shaft members 42 and 44. Because the present invention engages the respective outer end portions 146 and 148 of the shaft members 42 and 44 and exerts a force 150 that serves to urge them apart, the forces 152 exerted by the belt 56 on the pulleys 50 and 52 is substantially neutralized.

With conventional prior art tensioning arrangements as shown in FIGS. 7 through 10, a force 200 is exerted at the base or support end of the shaft member 244 which carries the driven pulley 252 by a compression spring 290. Shaft member 244 is mounted in an L-shaped arm which is pivotally mounted on the deck 232. That force 200 acts to urge the L-shaped arm and its driven pulley 252 away from the drive pulley 250 and maintain tension in the belt 256 as the implement 232 moves vertically and/or laterally relative to the vehicle frame 212, i.e. moves between the positions illustrated in FIGS. 8 and 10. As the compression spring 290 expands and/or contracts between the positions shown in FIGS. 7 and 9, the belt 256 pulls on the drive and driven pulleys 250 and 252 and the respective outer end portions of the first and second shaft members 242 and 244 to exert bending forces on each shaft members 242 and 244. These bending forces impose loadings on the bearings and surfaces supporting the respective shaft members 242 and 244, which contributes to faster and more severe wear between the bearings and bearing support surfaces of the shaft members 242 and 244. Accordingly, bearing failures occur. When the bearings supporting the drive shaft or crankshaft fail, expensive engine repair expenses result.

Figure 11:
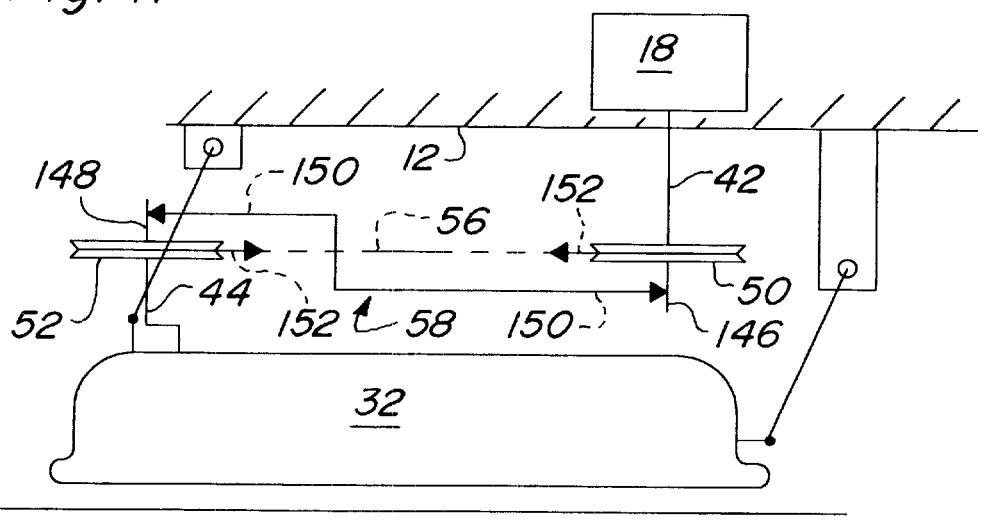
FIG. 11 is a schematic side view of the forces exerted on the drive and driven shaft members by the present tensioning device.

Looking now to FIG. 11, it can be seen that with the tensioning device of the present invention, the forces 150 urging the first and second shaft members 42 and 44 apart is applied to the outer ends 146 and 148 of the shaft members 42 and 44. Accordingly, bending forces exerted on the first and second shaft member 42 and 44 are reduced significantly and bearing wear and failures between those members 42 and 44 and any supporting bearings 142 and 144 are reduced with the present invention.

Figure 12:
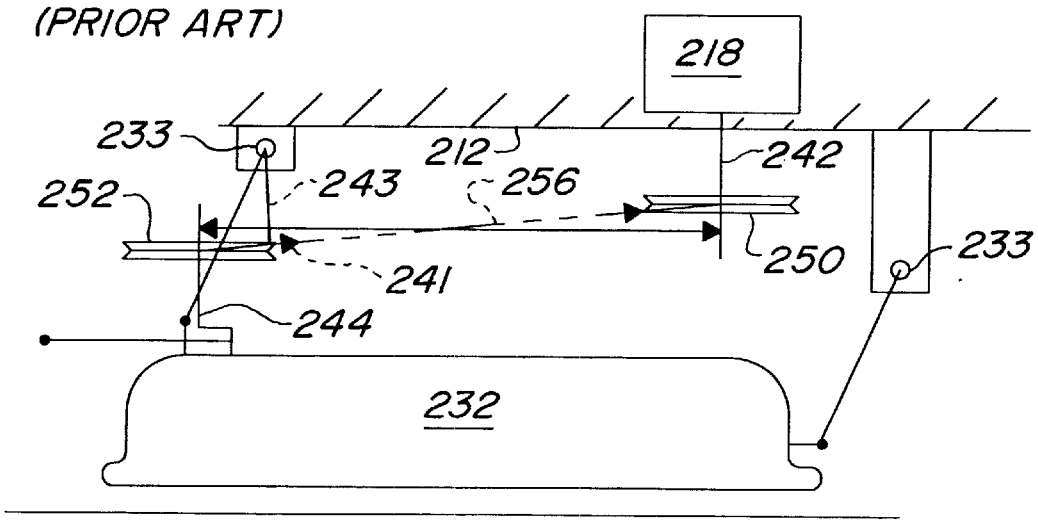
FIG. 12 is a schematic side view of a belt drive for an implement illustrating the forces applied to the implement by the prior art tensioning arrangement of FIG. 7.

The present tensioning device further serves to reduce the force needed to lift the implement from a lowered to a raised position. With prior art tensioning devices that urge the driven pulley 252 away from the drive shaft, as illustrated in FIG. 12, the force 242 is exerted by the tensioned belt 256 on the driven pulley 252. This force 242 acts through moment arm 243 that extends between the pivotal support 233 and force 242 to urge the implement 232 down about the pivotal supports 233 on the vehicle frame 212.

As shown in the schematic illustration of FIG. 11, the present tensioning device 58 exerts an opposing force 150 on the outer cantilevered end portions 146 and 148 of the drive and driven shafts 42 and 44 that serves to counteract the force 152 exerted by the belt 56 on the drive and driven pulleys 50 and 52 to neutralize the force urging the implement downwardly. Accordingly, the lift force required to raise the deck 32 with the present invention is less than that required with prior art structures such as that illustrated schematically in FIGS. 7 through 10 and 12.

I claim:

1. A tensioning device usable with a powered vehicle that is coupled with an implement, wherein the vehicle includes a first shaft member driven by the vehicle power source and the implement includes a second shaft member, said first and second shaft members being generally parallel and respectively carrying first and second pulleys with an endless drive element being operatively connected between the pulleys to drive the second shaft element, each shaft member having first and second end portions with the first end portions being supported and the second end portions being unsupported, wherein one of the shaft members is moveable with respect to the other shaft member, said tensioning device comprising:

first and second members slideably coupled together, each of said slideable members having a portion operatively connected with a respective one of the second end portions of the first and second shaft members, and biasing structure operative between the portions for urging one portion away from the other portion to urge at least one of the second end portions of said shaft members away from the other shaft member to tension the endless drive element.

2. The device defined in claim 1 wherein the biasing structure is a compression spring carried by and between the first and second slideable members.

3. The device defined in claim 2 wherein first and second stops are provided between the first and second slideable members and the compression spring is carried between the stops.

4. The device defined in claim 3 wherein at least one of the stops is adapted to be adjusted so that the compression of the spring can be varied.

5. The device defined in claim 4 wherein a locking structure is operatively connected with the adjustable stop and adapted to releasably secure it in a first position where the spring is under compression or a second position where the spring is under lesser compression.

6. The device defined in claim 5 wherein an overcenter latching mechanism is provided with the locking structure to secure the one stop in its first position.

7. The device defined in claim 1 wherein the vehicle includes a frame and the implement is carried by the frame and adapted to be adjusted vertically with respect to the frame, the first and second shaft members extend generally vertically and the end portions of the first and second slideable members are adapted to remain in engagement with the first and second shaft members as the implement is adjusted vertically.

8. The device defined in claim 7, wherein the first and second shaft members are each provided with a seat, the end portions of the first and second slideable members are provided with respective faces that are removably receivable with the seats.

9. The device defined in claim 8 wherein the seats are grooved channels and the faces are semi-circular surfaces.

10. The device defined in claim 1 herein the tensioning device is used with a first shaft member that is operatively coupled with an engine drive shaft that is rotatably supported by bearings.

11. The invention defined in claim 10, herein the second shaft member is rigidly supported by a swingable arm.

12. A device for tensioning an endless drive element mounted on first and second pulleys that are carried on respective generally parallel and spaced apart first and second shaft members, each shaft member having first and second end portions with the first end portions being supported and the second end portions being unsupported, wherein one of the shaft members is moveable with respect to the other shaft member, said tensioning device comprising:

first and second members slideably coupled together, each of said slideable members having a portion operatively connected with a respective one of the second end portions of the first and second shaft members, a U-shaped guide structure provided with the first slideable member, said guide structure having generally parallel and spaced apart legs with aligned openings therein to allow the second slidable member to be in registry with the guide structure and move back and forth relative to the first slidable member, and biasing structure operative between the portions for urging one portion away from the other portion to urge at least one of the second end portions of said shaft members away from the other shaft member to tension the endless drive element.

13. The device defined in claim 12 wherein the second slideable member includes spaced apart ends with one end being slideably and removably receivable in the aligned openings.

14. The device defined in claim 13 wherein one shaft member is provided with a seat and the other end of the second slideable member is provided with a face that is removably engageable with the seat.

15. The device defined in claim 14 wherein the seat includes a channel and the face includes a semi-circular surface adapted to be received in said channel.

16. The device defined in claim 12 wherein the guide structure receives one end of the first slideable member and the biasing structure is carried by the second slideable member between the guide structure and other end of the second slideable member.

17. The device defined in claim 16 wherein first and second stops are carried respectively on the first and second slideable members and the biasing structure includes a compression spring which is carried by the second member between the stops.

18. The device defined in claim 17 wherein one stop is adjustable to change the distance between it and the other stop and thereby vary the compression of the spring.

19. The device defined in claim 17 wherein one of the stops is operatively coupled with a releasable locking structure that serves to move the stop between a first position in abutment with the compression spring and a second position not in abutment with said spring.

20. The device defined in claim 19 wherein the locking means is provided with an overcenter latching structure operative to secure the one stop in abutment with the compression spring.

21. A tensioning device usable with an endless drive element mounted on first and second pulleys that are carried on respective generally parallel and spaced apart first and second shaft members, wherein one of the shaft members is moveable with respect to the other shaft member, said tensioning device comprising:

first and second members slideably coupled together, each of said slideable members having a portion operatively connected with one of the first and second shaft members, said first slidable member having a U-shaped guide structure with generally parallel and spaced apart legs having aligned holes therethrough, said second slidable member including spaced apart ends with one end being slidably and removably receivable in the aligned holes, the second slidable member being provided with a face that is removably engagable with a seat that is provided on one shaft member; and biasing structure operative between the portions for urging one portion away from the other portion to move the one shaft member away from the other shaft member.

22. A tensioning device usable with an endless drive element mounted on first and second pulleys that are carried on respective generally parallel and spaced apart first and second shaft members, wherein one of the shaft members is moveable with respect to the other shaft member, said tensioning device comprising:

first and second members slideably coupled together, each of said slideable members having a portion operatively connected with one of the first and second shaft members, said first slidable member having a U-shaped guide structure with generally parallel and spaced apart legs having aligned holes therethrough, said second slidable member including spaced apart ends with one end being slidably and removably receivable in the aligned openings, the second slidable member being provided with a semi-circular surface that is removably engagable with a channel-shaped seat that is provided on the other shaft member; and biasing structure operative between the portions for urging one portion away from the other portion to move the one shaft member away from the other shaft member.

* * * * *